United States Patent [19]
Harrington

[11] Patent Number: 5,581,376
[45] Date of Patent: Dec. 3, 1996

[54] SYSTEM FOR CORRECTING COLOR IMAGES USING TETRAHEDRAL INTERPOLATION OVER A HEXAGONAL LATTICE

[75] Inventor: Steven J. Harrington, Holley, N.Y.

[73] Assignee: Xerox Corporation, Stamford, Conn.

[21] Appl. No.: 598,741

[22] Filed: Feb. 8, 1996

Related U.S. Application Data

[63] Continuation of Ser. No. 297,473, Aug. 29, 1994, abandoned.

[51] Int. Cl.$^6$ .................................................. G03F 3/08
[52] U.S. Cl. ...................... 358/518; 358/525; 382/276; 395/131
[58] Field of Search ............................ 382/276; 358/525, 358/518; 355/38, 77; 348/45; 395/131

[56] References Cited

U.S. PATENT DOCUMENTS

| | | | |
|---|---|---|---|
| 2,790,844 | 4/1957 | Neugebauer | 178/5.2 |
| 4,275,413 | 6/1981 | Sakamoto et al. | 358/525 |
| 4,477,833 | 10/1984 | Clark et al. | 358/80 |
| 4,500,919 | 2/1985 | Schreiber | 358/78 |
| 5,241,373 | 8/1993 | Kanamori et al. | 358/518 |
| 5,305,119 | 4/1994 | Rolleston et al. | 358/522 |
| 5,377,041 | 12/1994 | Spaulding et al. | 358/518 |
| 5,390,035 | 2/1995 | Kasson et al. | 358/518 |

OTHER PUBLICATIONS

Research Report "Tetrahedral Interpolation Technique for Color Space Conversion" James Kasson Jan. 1993 IBM Research Division.

Color Correction Technique for Hard Copies by 4-Neighbors Interpolation Method, Kanamori Journal of Imaging Science and Technology vol. 36, No. 1 Jan./Feb. 1992 pp. 73–80.

A Color Transformation Algorithm Using "Prism" Interpolation Kanamori, IS & TS Eight Intern'l Congress on Advances in Non-Impact Prinoting Technologies, (1992) pp. 477–482.

*Primary Examiner*—Jose L. Cous
*Assistant Examiner*—Anh Hong Do
*Attorney, Agent, or Firm*—Thomas B. Zell; Duane C. Basch

[57] ABSTRACT

Input device signals $R_s$, $G_s$, $B_s$ generated by an image input terminal are converted to colorimetric values $R_c$, $G_c$, $B_c$. The colorimetric values processed by an image processing unit to generate address entries to a lookup table which stores a set of transform coefficients with which the $R_c$, $G_c$, $B_c$ values may be processed to convert them to $C_x$, $M_x$, $Y_x$, $K_x$ colorant signals or any multi-dimensional output color space, which include but are not limited to CMYK or spectral data. Values which are not directly mapped from the table are determined using tetrahedral interpolation over a hexagonal lattice. The hexagonal lattice is formed by offsetting by a half unit every other row of one of its dimensions relative to another dimension. The offset provides closer packing of sample points that define more regular tetrahedrons to reduce relative interpolation errors. The packing also allows for easy lookup table access and simple tests to determine which tetrahedron contains a desired value.

21 Claims, 16 Drawing Sheets

SYSTEM FOR CORRECTING COLOR IMAGES USING TETRAHEDRAL INTERPOLATION OVER A HEXAGONAL LATTICE

This is a continuation of application Ser. No. 08/297,473, filed Aug. 29, 1994, now abandoned.

The present invention relates to a method and apparatus for performing color correction when reproducing a color image, and in particular to a method of transforming an image from a first color space to a second color space using a three-dimensional lookup table with interpolation.

BACKGROUND OF THE INVENTION

Color correction or transformation of color images is performed to convert images from one color space to another. Images may be represented using a device independent color space or a device dependent color space. Device independent color spaces represent color images independent from particular input and output devices so as to enable independent color imaging between input and output devices. Generally, a color image is transformed to a device dependent color space of an output device before the color image is rendered to insure that the colormetry of the original image is consistent with its reproduction. Such a transformation is performed regardless of whether the original image is defined in a device dependent color space or in a device independent color space. Closed systems that consist for example of a scanner and a printer that are not interconnected with external devices do not require an original color image to be transformed to a device independent color space. Such closed system have color transformation system that generate a color image represented by a first color space and subsequently convert that color space to a second color space before reproduction. Color transformation systems capable of independent color imaging represent color images in a third or a device independent color space which is readily transferable between a plurality of image output devices.

Color images can be generated by an input image terminal such as a scanner or a color image creation program operating on a color workstation. Color images processed by a scanner or a workstation consists of a two dimensional array of picture elements (pixels). The color of each pixel of an image may be represented using a plurality of color spaces. Scanner output is commonly transformed to a color space of tristimulus values, for example, additive primaries red, green and blue (RGB) color space. These values are typically a linear transformation of the standard XYZ coordinates of CIE color space, or a corrected transform of those values. In the case of computer generated images, the computer workstation is operated by a user to create, edit or view "softcopy" color images on the color monitor of the workstation. Colors selected by the user at the user interface of a workstation can also be defined in a color space of tristimulus values such as additive primaries RGB. These colors are defined in a device independent manner using for example color model transformations that are described in "Color Encoding Standard", Xerox System Integration Standard, Xerox Corp, Palo Alto, Calif., July 1991, XNSS 289107 (The Xerox Color Encoding Standard).

An image generated by an image input terminal must be converted to subtractive primaries cyan, magenta, yellow and black (CMYK) or (simply the CMY) color space before being reproduced on an image output terminal such as a printer. CMY color space is typically used to represent the formulation of colored dyes, inks, or toners on paper. Printers typically operate by adding multiple layers of ink or colorant on each page. The response of the addition of colors by the printer tends to be relatively non-linear. Consequently, colors are defined for a particular printer and accordingly color spaces defined for a printer are device dependent. Thus, a printer receives information in a device independent color space from, for example, a workstation. The printer must then convert that information into its device dependent color space. There exist many different methods to convert between color spaces of images produced at a scanner or a workstation to a color space of images to be produced at a printer. Generally, U.S. Pat. No. 4,500,919 to Schreiber and U.S. Pat. No. 2,790,844 to Neugebauer describe the desirability of operating in a device independent color space with subsequent conversion to a device dependent color space.

Color correction consists of mapping points from a three-dimensional color space to a three-dimensional or four-dimensional color space. This mapping depends on the physical properties of a marking device or printer system which is typically nonlinear (as noted above). An effective approach to solving this problem is to use a coarse three-dimensional lookup table with interpolation. The lookup table provides an arbitrary mapping between different devices and the interpolation reduces the size of the table so that large amounts of memory are not required by the system to store a large number of sample points. In general, a lookup table contains values on a uniform grid for each of the three color coordinates of a color space. For example, the color space is divided into parallelepipeds with table values at the vertex points of the parallelepipeds. (An example of a parallelepiped is shown in FIG. 16.) Interpolation is performed for values of points within the volumes of the parallelepipeds by using their position within the volume and the values of samples at the vertices. A common approach to interpolation is trilinear interpolation which gives a linear weighting of all eight vertices. Alternatively, in tetrahedral interpolation the parallelepiped is divided into tetrahedrons as shown in FIG. 17. The points within each tetrahedron are interpolated based on its four vertices as described in U.S. Pat. No. 4,275,413 to Sakamoto and U.S. Pat. No. 4,477,833 to Clark et al. Tetrahedal interpolation is preferred over alternative interpolation techniques because it is computationally simple and requires the retrieval of only four vertex values rather than eight as in trilinear interpolation.

Specifically, in U.S. Pat. No. 4,275,413 to Sakamoto, information is placed into lookup tables and stored in a memory, where the lookup table relates input color space to output color space. The lookup table is commonly a three dimensional table since color is defined with three variables. In RGB space, at a scanner or computer, space can be defined as three dimensional with black at the origin of a three dimensional coordinate system 0, 0, 0, and white at the maximum of a three dimensional coordinate system which in an 8-bit system, would be located at 255, 255, 255. Each of the three axes radiating from the origin point therefore respectively define red, green, and blue. A similar construct can be made for the printer, with axes representing cyan, magenta, and yellow. In the 8-bit system suggested, there will be, however, over 16 million possible colors ($256^3$). There are clearly too many values for a 1:1 mapping of RGB to CMY. Accordingly, only a relatively small number of samples are used to do the mapping from RGB to CMY, perhaps on the order of 1,000. Therefore, the lookup tables consist of a set of values which could be said to be the intersections for corners of a set of cubes (or parallelepipeds) mounted on top of one another. Colors falling within each cubic volume can be interpolated from the measured values through tetrahedral interpolation.

A hybrid approach that divides the parallelepiped into prisms, as shown in FIG. 18, and uses triangular interpolation in two dimensions and linear interpolation in the third is described by Kanamori et al. in "A Color Transformation Algorithm using Prism Interpolation" IS&T's 8th International Congress on Advances in Non-Impact Printing Technologies pp. 477–482 (1992). This method requires the retrieval of six vertex values. Variations on how a parallelepiped is subdivided into tetrahedrons has been described by Kanamori et al. in "Color Correction Technique for Hard Copies by 4-Neighbors Interpolation Method", Journal of Imaging Science and Technology Vol. 36, No. 1, pp. 73–80 (1992). This contrasts the decomposition shown in FIG. 17 which offers simplicity in the interpolation calculations. Specifically, the tetrahedrons are elongated in FIG. 17 which can give rise to larger interpolation errors than those for more regular tetrahedrons as in FIG. 19. Alternatively, a decomposition which gives more uniform tetrahedrons as taught by Kanamori et al. is shown in FIG. 20, where two decompositions must be applied to alternate cells. Another technique published by Kasson et al. in "A Tetrahedral Interpolation Technique for Color Space Conversion", SPIE Proceedings Vol. 1909:127–138, (1993), describes adding an additional sample point to the center of each parallelepiped as shown in FIG. 17. The method of adding additional body-centered sample points to decompose parallelepipeds to tetrahedra provides more regular tetrahedrons than those shown in FIG. 17.

The references cited herein are incorporated by reference for their teachings.

SUMMARY OF THE INVENTION

In accordance with one aspect of the invention there is provided a color image processing system for converting a color image from a first color space to a second color space. An image input terminal generates three dimensional image signals from the first color space of a color input image. A memory, addressable by image signals from the first color space, and including memory locations stores corrective image signals from the second color space, the image signals from the first color space defining a three dimensional lattice of color samples with one dimension of the lattice of color samples having a selected sampling interval offset relative to at least one other dimension of the lattice of color samples. A circuit determines a plurality of color samples from the image signals that form a multifaced solid enclosing each three dimensional image signal in the lattice of color space samples, and generates a characteristic equation identifier for each multifaced solid. Also, the circuit generates a corrective image signal in the second color space for each image signal in the first color space, and interpolates each characteristic equation with the corrective image signals stored in the memory. An image output terminal, responsive to color image signals from the second color space, reproduces each corrective image signal to form a color output image that substantially corresponds to the color input image.

In accordance with another aspect of the invention there is provided a method for converting a color image from a first color space to a second color space. The method includes the steps of: generating three dimensional image signals from the first color space of a color input image; providing a memory, addressable by image signals from the first color space, and including memory locations for storing corrective image signals from the second color space, the image signals from the first color space defining a three dimensional lattice of color samples with one dimension of the lattice of color samples having a selected sampling interval offset relative to at least one other dimension of the lattice of color samples; determining a plurality of color samples from the image signals that form a multifaced solid enclosing each three dimensional image signal in the lattice of color space samples, the determining step generating a characteristic equation identifier for each multifaced solid; generating a corrective image signal in the second color space for each image signal in the first color space, the generating step interpolating each characteristic equation with the corrective image signals stored in the memory; and reproducing each corrective image signal to form a color output image that substantially corresponds to the color input image.

BRIEF DESCRIPTION OF THE DRAWINGS

These and other aspects of the invention will become apparent from the following descriptions to illustrate a preferred embodiment of the invention read in conjunction with the accompanying drawings wherein the same reference numerals have been applied to like parts and in which.

DETAILED DESCRIPTION

1. System Environment for Color Image Correction

Figure 1:
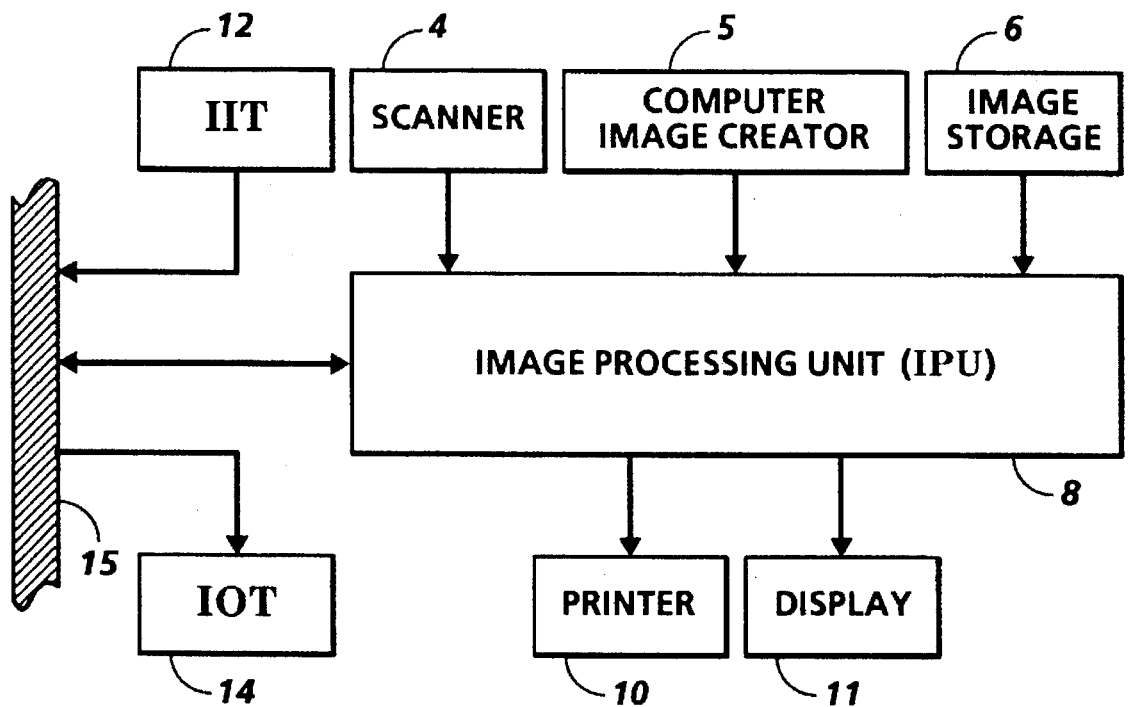
FIG. 1 is a block diagram of a basic system for carrying out the present invention.

Referring now to the drawings where the showings are for the purpose of describing an embodiment of the invention and not for limiting same, a basic system for carrying out the present invention is shown in FIG. 1. In the basic system, image input terminals (IIT) which include scanner 4, computer image creator 5 and image storage or file server 6 are connected to image processing unit (IPU) 8. IPU 8 is also connected to image output terminals (IOT) which include printer 10 and image display 11. Image information received by IPU 8 from an IIT is manipulated before being rendered by printer 10 or displayed on image display 11. Additionally, IPU 8 can receive image information from auxiliary or remote IIT 12 and can transmit manipulated image information to auxiliary or remote IOT 14 using network 15. Generally, image signals or picture elements (pixels) representing image information transmitted from an IIT to IPU 8 have a resolution and pixel density. The image signals can represent color or black and white images, and can have a large number of density levels that are recorded in a gray level format. The term "gray level" is used herein to described data for both black and white and color images.

Generally scanner 4, which may for example be the color scanner of the Xerox 5775 digital color copier, is calibrated to produce a set of digital signals to describe an original image using a colorimetric or device independent color space. Also, generally computer image creator 5 consists of a workstation that executes a conventional graphical user application such as "GlobalView®" developed by the Xerox Corporation. The conventional graphical user application provides a high level, device independent graphics software environment for creating, editing and viewing high quality color electronic images using two dimensional image elements. More specifically, image elements forming an image emitted from computer image creator or page description language driver 5 are defined using high level primitives of a page description language (PDL) such as Interpress used by Xerox® Corporation. Other examples of PDLs are Postscript® ("PS") which is described in "PostScript® Language Reference Manual", Second Edition, Addison-Wesley Publishing Co., 1990, and Hewlett Packard Printer Control Language ("HP-PCL") which is described in "PCL 5 Printer Language Technical Reference Manual", First Edition, Hewlett Packard Co., 1990. In general, a PDL provides a set of commands that are used to describe various graphic and textual elements forming an image to be printed.

Colorimetric spaces or models refer herein to color spaces which are transforms of CIE XYZ space (1931) (i.e. R,G,B color space) or the L*a*b* luminance-chrominance space ($LC_1C_2$). While many color spaces have three dimensions, it is possible to have color spaces with less than three dimensions or more than three dimensions. Representing a color in a device independent manner between image input terminals and image output terminals using color models is well known. A number of color reference models or systems have been developed some of which are described in the Xerox Color Encoding Standard. It will be assumed herein that the additive RGB color model used to describe an image element on display 11 can be readily encoded using a known reference color model and converted to the CMY subtractive model. For example, the Xerox/RGBLinear color model described in the Xerox Color Encoding Standard can be used to represent the color of image elements developed on computer image creator 5.

Figure 2:
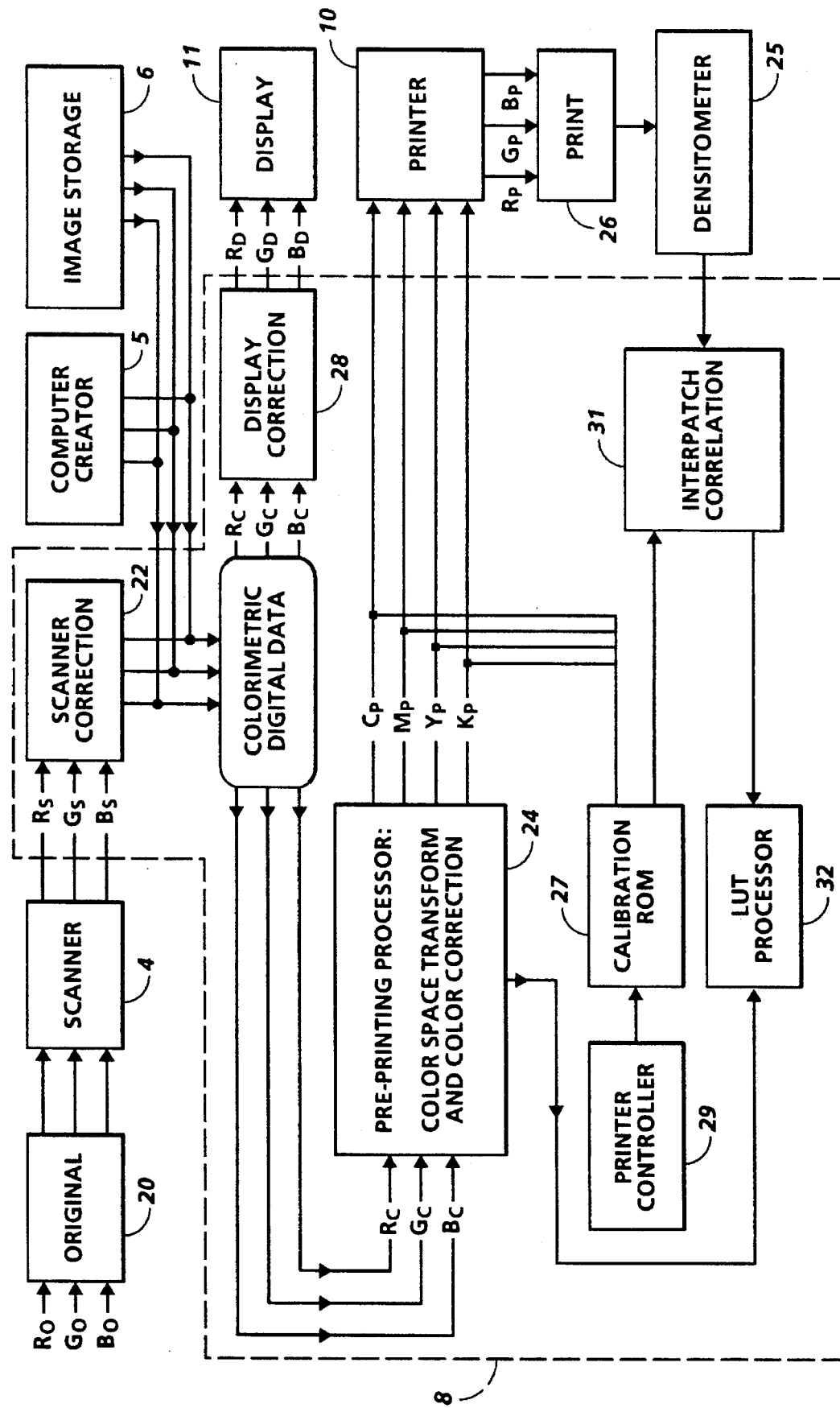
FIG. 2 is a detailed block diagram of the image processing unit shown in FIG. 1.

With reference now to FIG. 2 which shows IPU 8 in more detail. Resulting from the scanning of original image 20 is a set of scanner image signals $R_s$, $G_s$, $B_s$, defined in device dependent scanner space, which is referred to herein as a color space which is defined only in terms of operation of a particular device using the color space. Incorporated into IPU 8 (or scanner 4) is a post-scanning processor 22. Post-scanning processor 22 provides correction of scanner image signals $R_s$, $G_s$, $B_s$ to colorimetric terms, $R_c$, $G_c$, $B_c$, which are typically digital in nature. To be rendered on printer 10, these device independent signals $R_c$, $G_c$, $B_c$ are in turn converted to device dependent signals using pre-printing processor 24. The output of pre-printing processor 24 is an image defined in terms of a device dependent space, or colorant driving signals $C_p$, $M_p$, $Y_p$, $K_p$ that are used to drive printer 10. The colorant values, C,M,Y,K, represent the relative amounts of cyan, magenta, yellow, and black toners that are to be deposited over a given area in an electrophotographic printer, such as, the Xerox 5775 digital color copier. A printed output image 26 can be defined in terms of $R_p$, $G_p$, $B_p$, which is hoped to have a relationship with original image 20 which can be defined in terms of $R_o$, $G_o$, $B_o$ such that the printed output image 26 has a color that is colorimetrically similar to the original image, although that similarity is ultimately dependent upon the color gamut of the printing device.

Alternatively, a scanned image described in colorimetric terms $R_c$, $G_c$, $B_c$ can be reproduced on display 11 using pre-display processor 28. It is well known how to model image signals to be displayed on a monitor and does not form part of the invention. Such displays contain three primary color phosphors. To generate a color defined by a set of $R_c$, $G_c$, $B_c$ values, the monitor stimulates each primary phosphor with an intensity determined by the corresponding $R_D$, $G_D$, $B_D$ value converted by pre-processor display 28. Also, images output by computer creator 5 and images retrieved from image storage 6 are generally specified in device independent colorimetric terms, $R_c$, $G_c$, $B_c$ using for example a PDL. The color of image signals or image elements (e.g. lines and text) may be represented in any of a variety of color notations or color spaces. Thus, once described using a colorimetric set of $R_c$, $G_c$, $B_c$ image signals, an image can be rendered on printer 10 or displayed on display 11 independent of its originating image input terminal.

Figure 3:
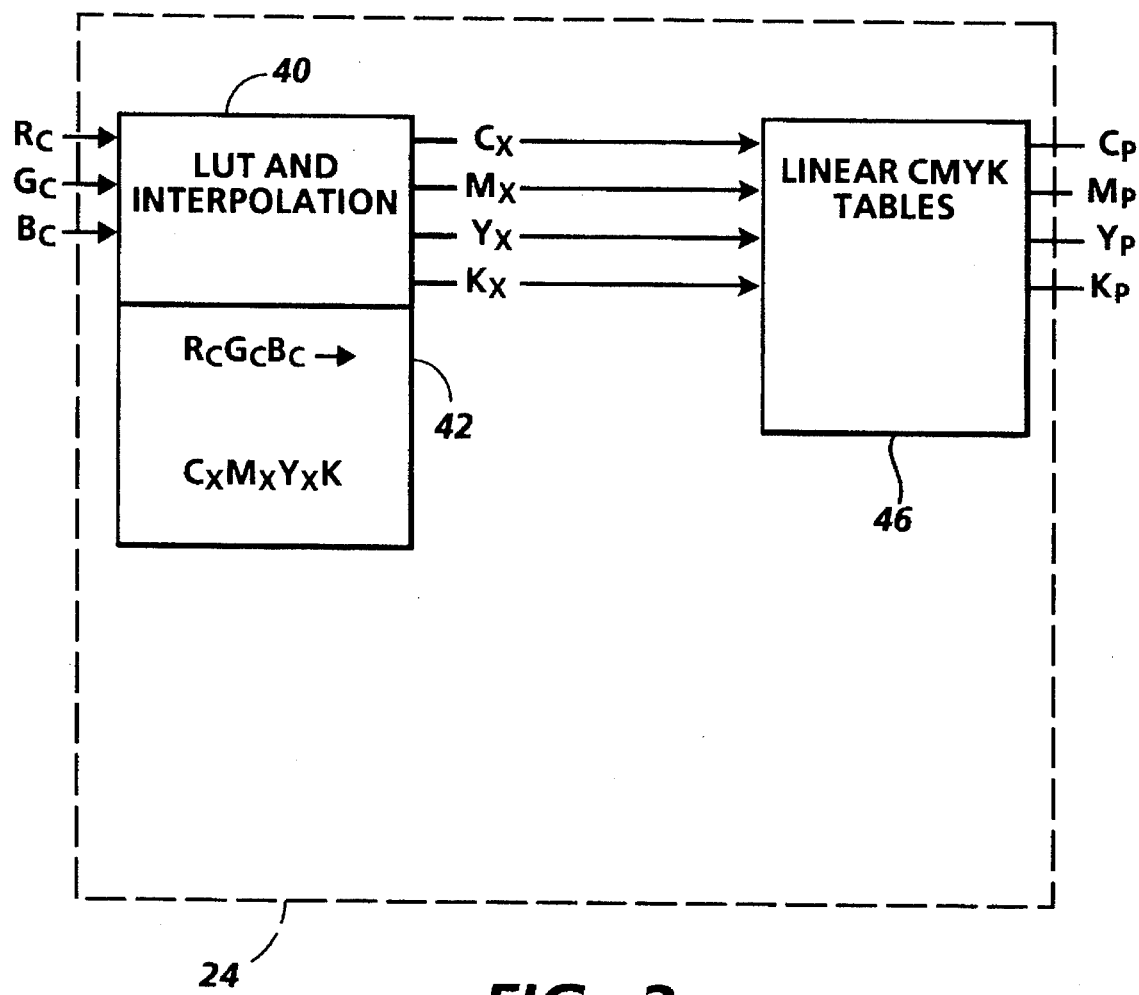
FIG. 3 is a detailed block diagram pre-printing processor shown in FIG. 2.

With reference now to FIG. 3, pre-printing processor 24 which includes image color space transformation and color correction, initially, $R_c$, $G_c$, $B_c$ color signals are directed to an interpolation device 40, which includes a three dimensional lookup table stored in a device memory 42 such as a RAM or other addressable memory device, which will meet speed and memory requirements for a particular device. Color signals $R_c$, $G_c$, $B_c$ are processed to generate address entries to the lookup table which stores a set of transform coefficients with which the $R_c$, $G_c$, $B_c$ may be processed to convert them to $C_x$, $M_x$, $Y_x$, $K_x$ colorant signals or any multi-dimensional output color space including but not limited to CMYK or spectral data. Values which are not directly mapped from the table are determined in accordance with the present invention using tetrahedral interpolation over a hexagonal lattice, which is described in detail below. Subsequent to the $R_c$, $G_c$, $B_c$ to $C_x$, $M_x$, $Y_x$, $K_x$ mapping, which includes black addition for under color removal, gray balance processing is performed at 46 to generate colorant driving signals $C_p$, $M_p$, $Y_p$, $K_p$, as described in U.S. Pat. No. 5,305,119 to Rolleston which is incorporated herein by reference. Colorant driving signals $C_p$, $M_p$, $Y_p$, $K_p$ are then output to printer 10 for reproduction of the original scanner signals $R_s$, $G_s$, $B_s$ on printer 10 or IOT 14.

2. Building a Lookup Table (LUT) for a Hexagonal Lattice

In creating a three dimensional lookup table, a set of color patches are created, preferably including determined linearization and black addition. This is done by printing and measuring about 1000 to 4000 patches of printer colors distributed throughout the color space, i.e., a large set of printer driving signals are generated, in varying densities of combinations of C,M,Y,K, and used to drive the printer. The color of each patch is measured, using scanner 4 or a spectrophotometer 25 to determine color in terms of $R_c$, $G_c$, $B_c$ as shown in FIG. 2. The measured colors of these patches are used to build a three dimensional lookup table (LUT) relating $R_c$, $B_c$, $G_c$ defined colors to $C_x$, $M_x$, $Y_x$, $K_x$ defined colors. Conversions that do not include mapped and measured points may be interpolated or extrapolated. U.S. patent application Ser. No. 08/144,987 to Rolleston entitled, "Color Printer Calibration Test Pattern", filed Oct. 29, 1993, and U.S. patent application Ser. No. 08/223,194 to Rolleston entitled, "Color Printer Calibration With Improved Color Mapping Linearity", filed Apr. 5, 1994, are incorporated herein by reference for their teachings of lookup table generation.

With reference again to FIG. 2, a three dimensional lookup table can be generated by using a calibration image that is stored in a device memory such as calibration ROM 27. The calibration image which defines a set of CMYK input signals are directed from ROM 27 to printer 10 by controller 29. Densitometer or spectrophotometer 25 is used to scan calibration target 26 and produce $R_oG_oB_o$ signal values as a function of sensed density, representing the colors of each scanned patch. Interpatch correlation processor 31 reads the responses provided from densitometer 25 for each location in the calibration target and correlates the response with the input CMYK signals, to form a mapping which is inverted to yield an $R_cG_cB_c$ to CMYK mapping. LUT processor 32 receives data from interpatch correlation processor 31, and uses a linear interpolation function to generate additional data in the intervals between sampled data. LUT processor 32 may be responsive to operator or knowledge-based commands to generate more data in selected portions of the color gamut.

Figure 4:
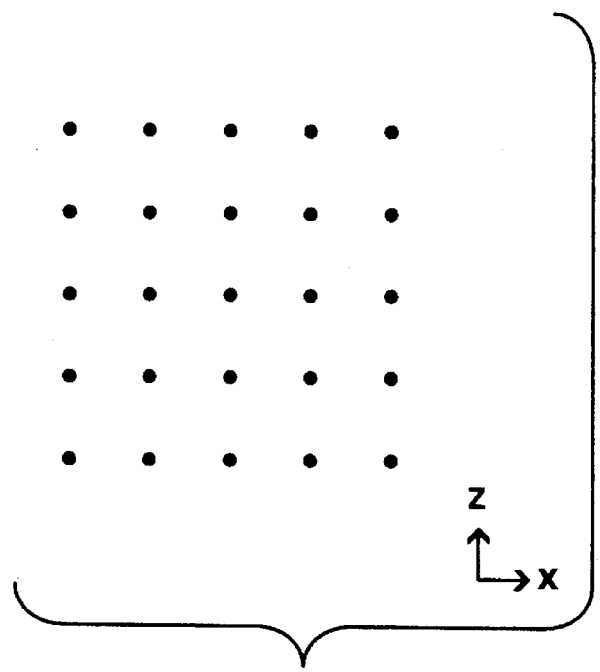
FIG. 4 illustrates an example of a conventional sample space used to derive a color space mapping.
Figure 5:
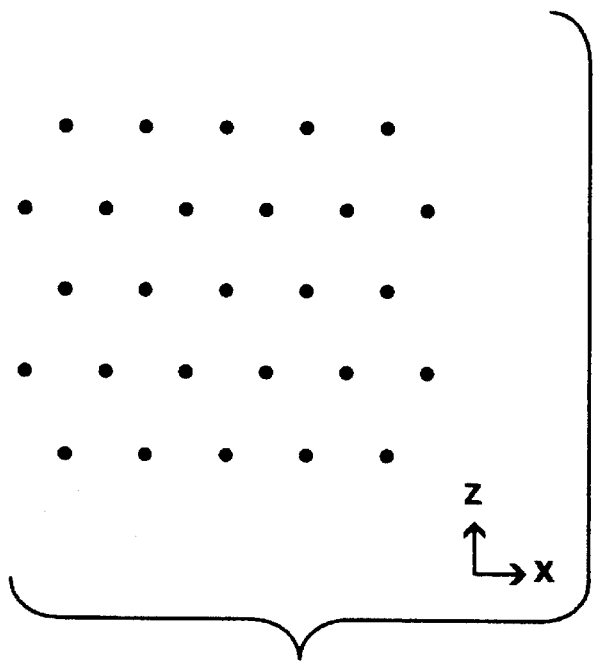
FIG. 5 illustrates an example of a sample space used to derive a color space mapping in accordance with the present invention.
Figure 6:
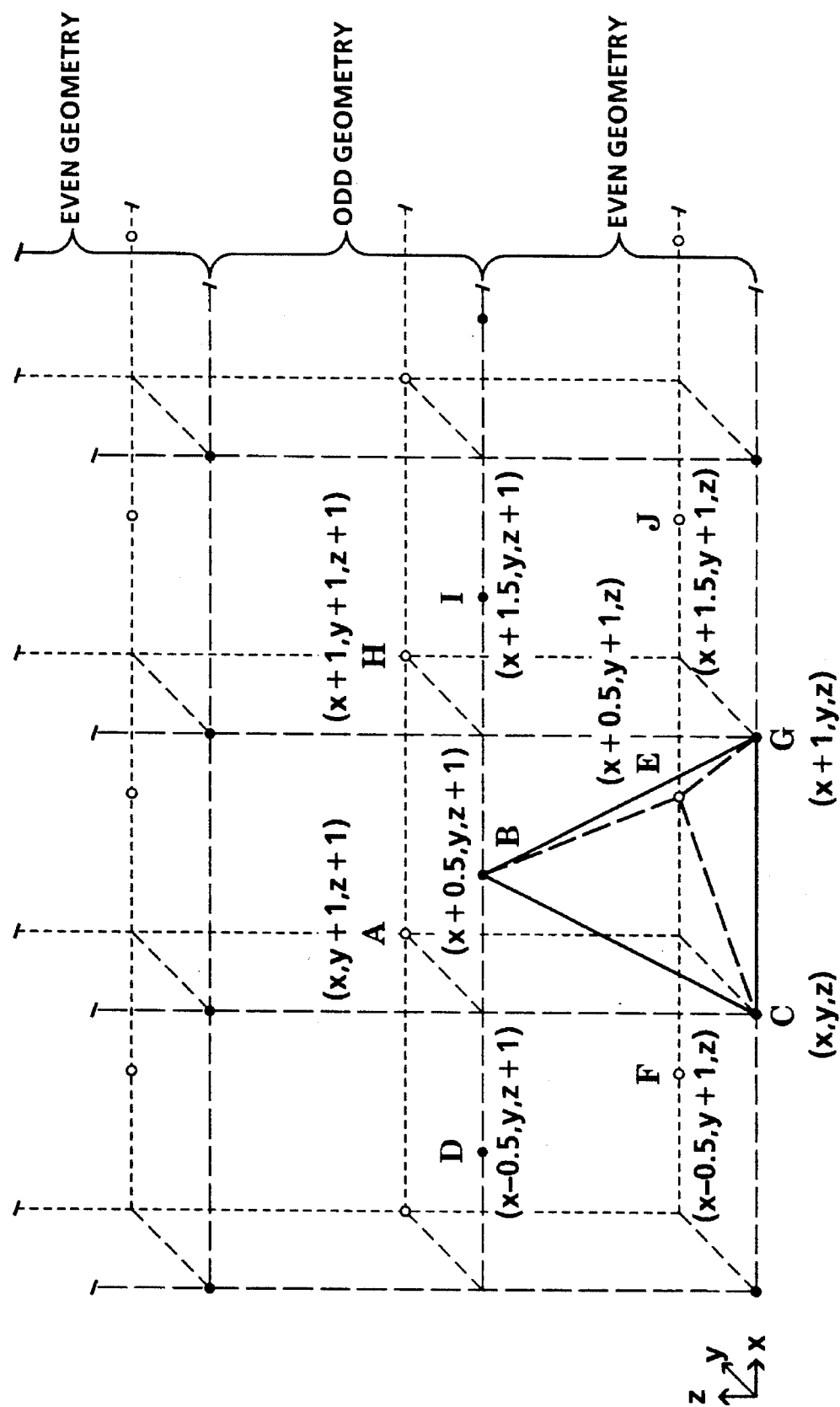
FIG. 6 illustrates the hexagonal lattice of FIG. 5 extended to a three dimensional positioning of sample points, where the phase of each shifted row alternates in the third dimension.
Figure 7:
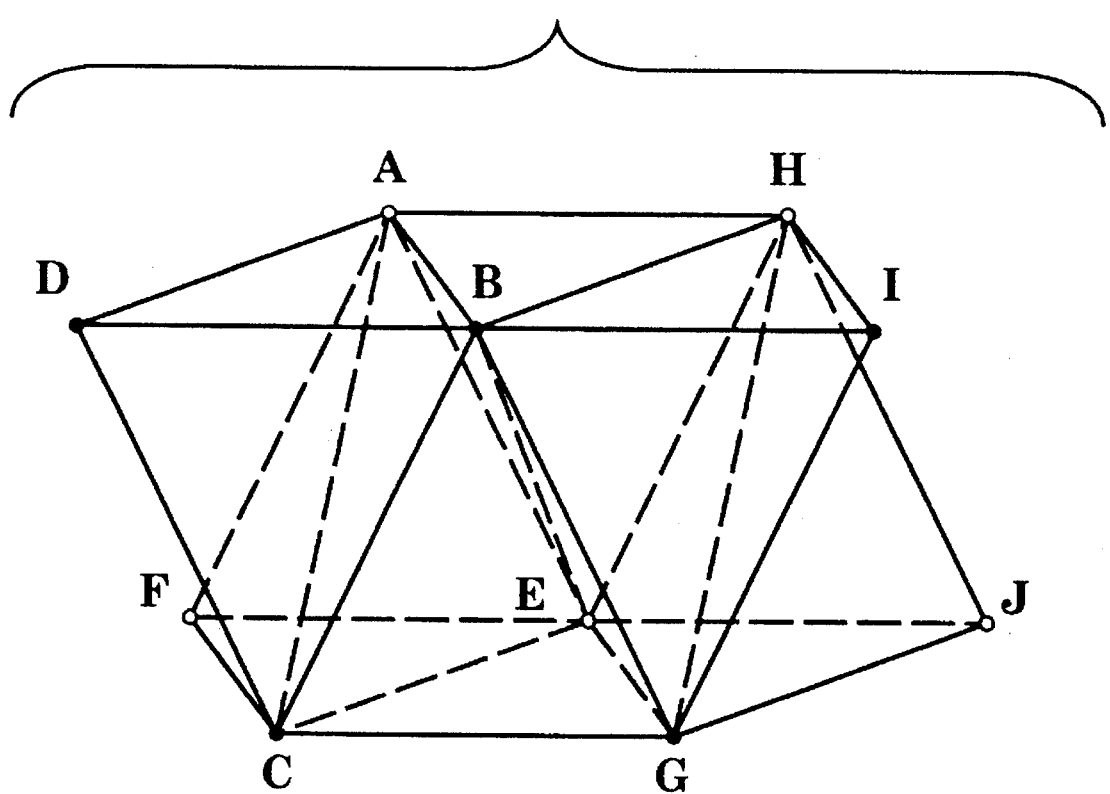
FIGS. 7 and 8 illustrate how the color sample space of FIG. 6 can be partitioned into tetrahedrons.
Figure 8:
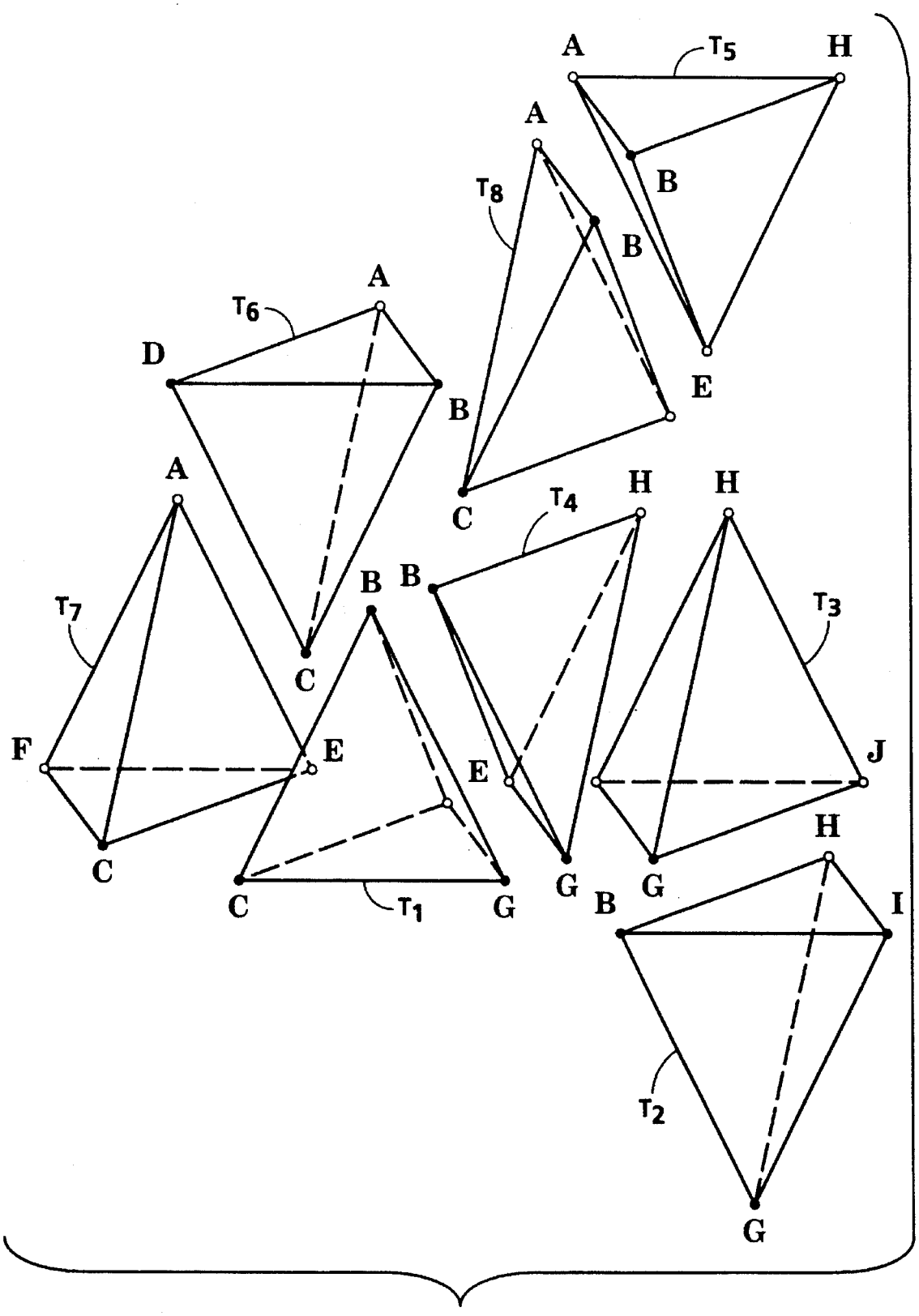

FIG. 4 illustrates a two dimensional example of a conventional sample space used to derive an RGB to CMYK mapping lookup table. In accordance with the invention, FIG. 5 is an illustration of a two dimensional sample space having a non-rectangular lattice (or non-rectangular sampling interval) which is used by LUT processor 32 in generating a lookup table. Thus, rather than the rectangular grid positions of FIG. 4, LUT processor 32 requires that every other row is shifted by a selected half a unit interval in one dimension to form a hexagonal lattice as shown in FIG. 5. This half unit shift of every other row adds an additional sample value to each shifted row. FIG. 6 shows the hexagonal lattice of FIG. 5 extended to a three dimensional positioning of sample points, where the phase of each shifted row alternates in the third dimension and the geometry alternates from even to odd every other row. In accordance with the invention, the placement of sample points as shown in FIG. 6 define a color space that can be partitioned into tetrahedrons that have eight geometries T1–T8 which are shown in FIGS. 7 and 8. These eight geometries T1–T8 repeat throughout the sample space and are evaluated individually when correcting an image signal color space which is described in detail below.

Figure 9:
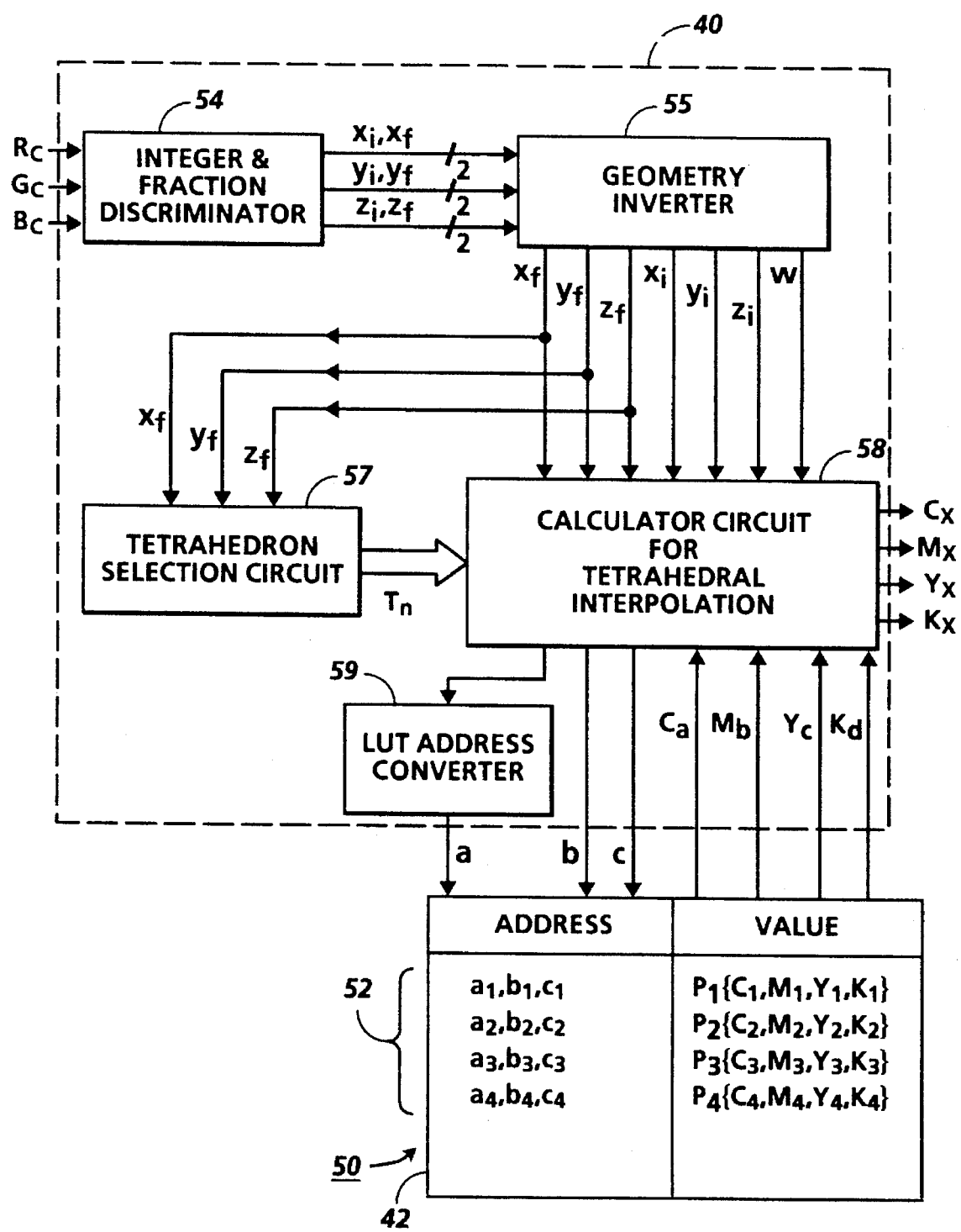
FIG. 9 is a detailed block diagram of the FIG. 3 lookup table and the FIG. 3 interpolation circuit.

Once the LUT processor 32, shown in FIG. 2 completes generating a lookup table mapping of colorimetric values to printer signals that defines a non-rectangular lattice of sample points, the lookup table mapping is stored in device memory 42 to form three dimensional lookup table (LUT) 50 shown in FIG. 9. Each memory address of the lookup table represents an image signal from a first color space (e.g. colorimetric values) that references a corresponding memory address location to provide corrective image signals in the second color space (e.g. printer signals). For example four address at 52 in LUT 50 refer to four points C, G, B and E which define a tetrahedron in the sample space shown in FIG. 6. Even though the position x, y, z in color space of the samples S(x,y,z) (where S is defined herein as C,M,Y and K such that S(x, y, z) corresponds to C(x, y, z), M(x, y, z), Y(x, y, z) and K(x, y, z)) are shifted by a half a unit for half of the rows, the sample points can be stored in a uniform three-dimensional array or LUT. That only one of the dimensions (e.g. the x coordinate) is shifted, only one dimension requires an increased number of entries. For example, a LUT size can be selected such that the index range is a power of two for two dimensions (e.g. $0 \leq x<17$, $0 \leq y<16, 0 \leq z<16$). This enables a LUT to be organized such that its indexing requires only simple masking and shifting operations. Consequently, LUT access does not require any multiplications and can be simple and efficiently implemented using conventional hardware or software.

3. Tetrahedral Interpolation Using a Hexagonal Lattice

Figure 10:
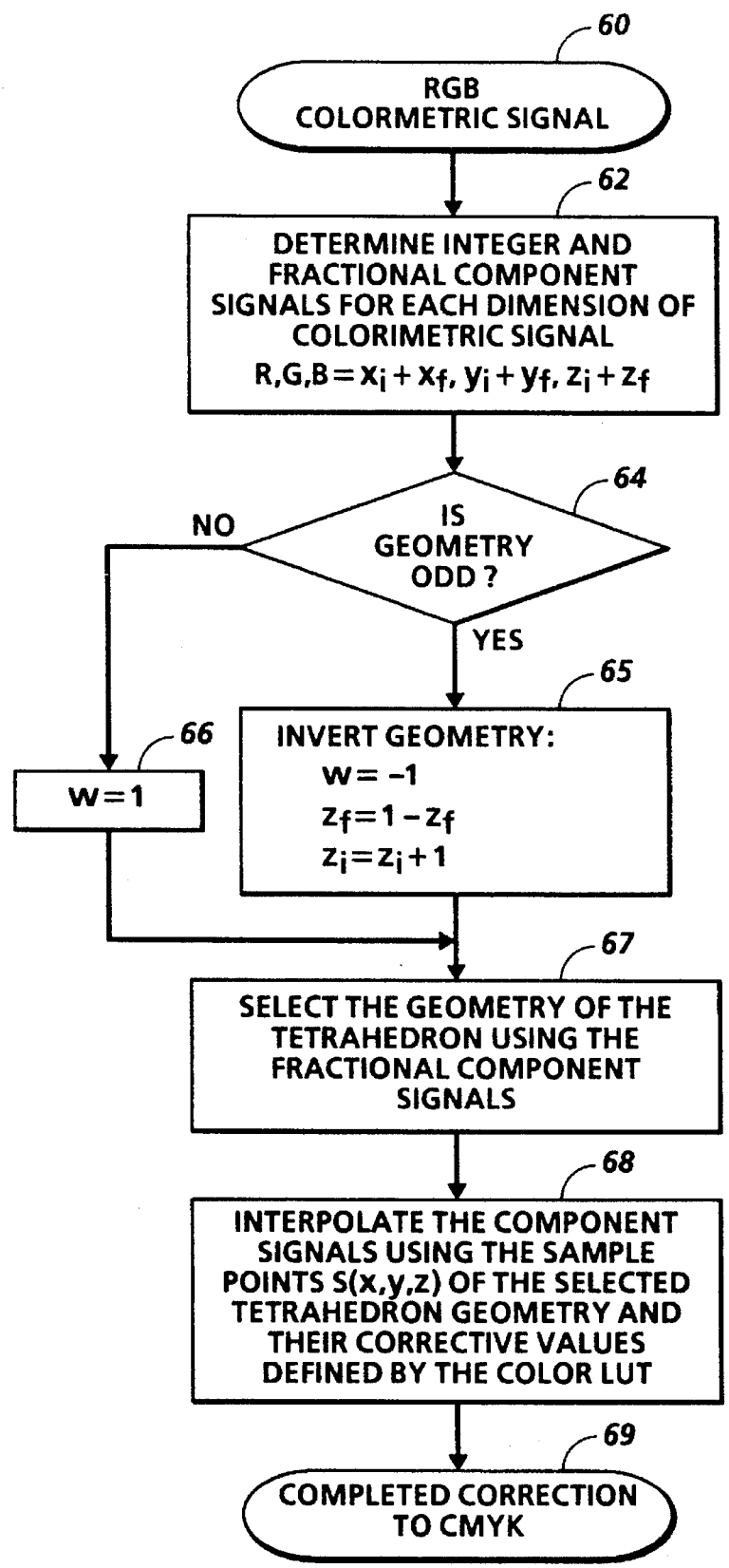
FIG. 10 is the process flow of the FIG. 9 interpolation circuit.

As described above and shown in FIG. 3, device independent signals $R_c$, $G_c$, $B_c$ are converted to device dependent signals or colorant driving signals $C_p$, $M_p$, $Y_p$, $K_p$ using pre-printing processor 24. Specifically, pre-printing processor 24 includes interpolation device 40 and a three dimensional lookup table which is stored in device memory 42. More specifically, FIG. 8 shows three dimensional LUT 50 which stores a set of transform coefficients with which the device independent signals $R_c$, $G_c$, $B_c$ are processed by interpolation device 40 to convert them to $C_x$, $M_x$, $Y_x$, $K_x$ colorant signals. In accordance with the invention, color correction is performed using interpolation circuit 40 and LUT 50. The process flow of interpolation circuit 40 is generally shown in FIG. 10. At step 60, $R_c$, $G_c$, $B_c$ colorimetric signals are input to integer and fraction discriminator 54. At step 62, discriminator 54 determines the integer component signals $x_i$, $y_i$, $z_i$ and fractional component signals $x_f$, $y_f$, $z_f$ for an $R_c$, $G_c$, $B_c$ colorimetric signal. The integer and fractional component signals $x_i$, $y_i$, $z_i$ and $x_f$, $y_f$, $z_f$ are input to geometry inverter 55. At step 64, geometry inverter 55, tests whether to use an even or an odd geometry, (shown in FIG. 6) by evaluating the relative position of the y and z integer components. If the geometry is odd, adjustments are made to each component of one dimension (e.g. 'z') and an offset value 'w' is set at step 65. If the geometry is even, the offset value 'w' is set at step 66. Integer and fractional component signals are then input to tetrahedron selection circuit 57 and calculator circuit 58. Circuit 57 must first determine which tetrahedron geometry is appropriate before interpolation is performed using calculator circuit 58.

Figure 11:
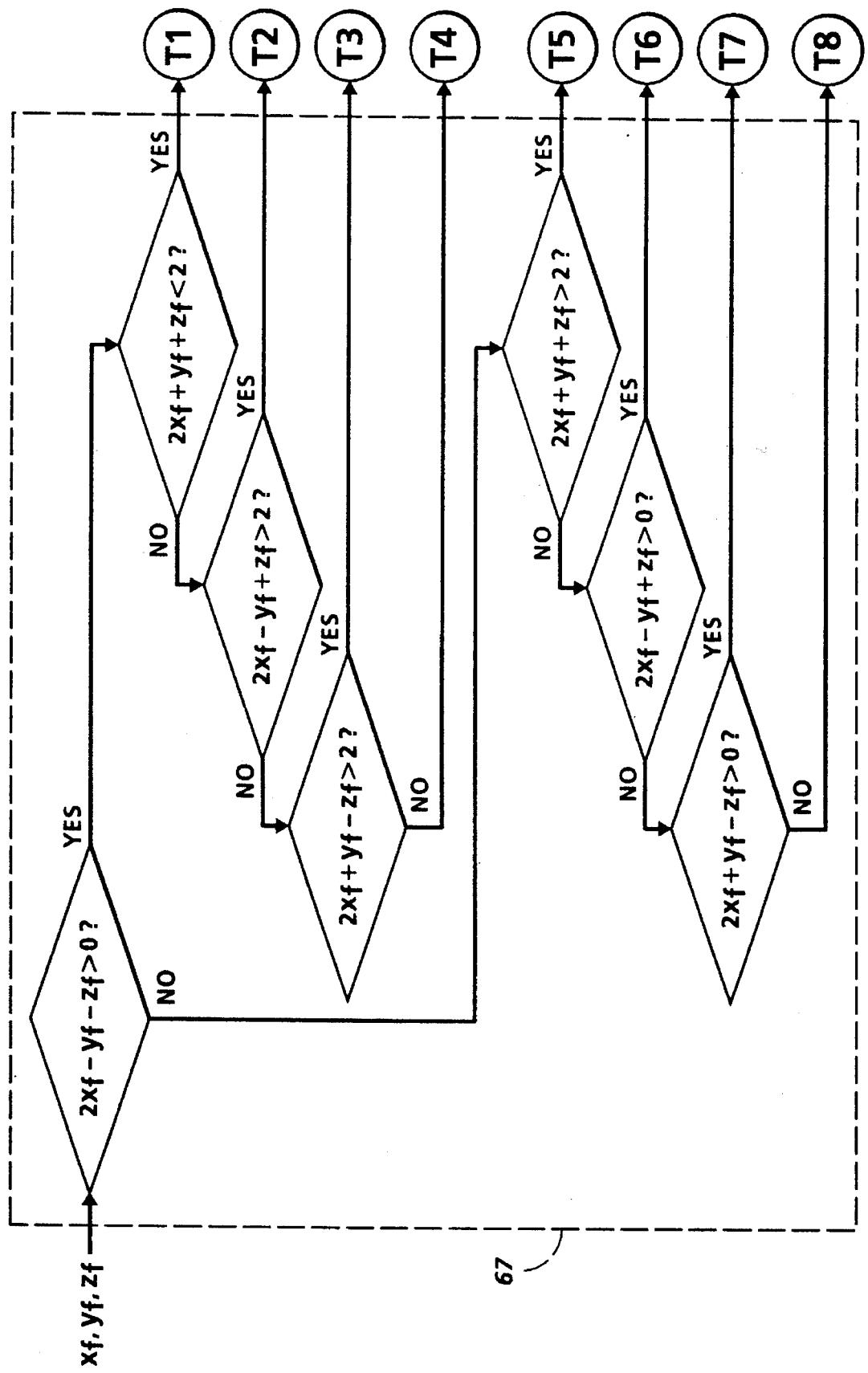
FIG. 11 shows step 67 of the FIG. 10 process flow in greater detail.

At step 67, tetrahedron selection circuit 57 selects a tetrahedron geometry from the set of eight possible tetrahedrons T1–T8 shown in FIGS. 7 and 8. Each tetrahedron T1–T8 has a unique characteristic equation. FIG. 10 shows step 67 which is performed by tetrahedron selection circuit 57 in detail. The selection process which is shown in FIG. 11, uses the fractional component signals $x_f$, $y_f$, $z_f$ to select from the set of eight tetrahedrons T1-T8. Specifically, circuit 57 tests each plane of the set of possible tetrahedra T1-T8 using the decision tree of FIG. 11. (In this embodiment each parallelepiped cell shown in FIG. 6 is a unit cube.) Once a leaf of the decision tree has been reached a tetrahedra geometry indicator signal $T_n$ is transmitted to calculation circuit 58 to indicate which geometry should be used to evaluate the current $R_c$, $G_c$, $B_c$ colorimetric signal.

Figure 12:
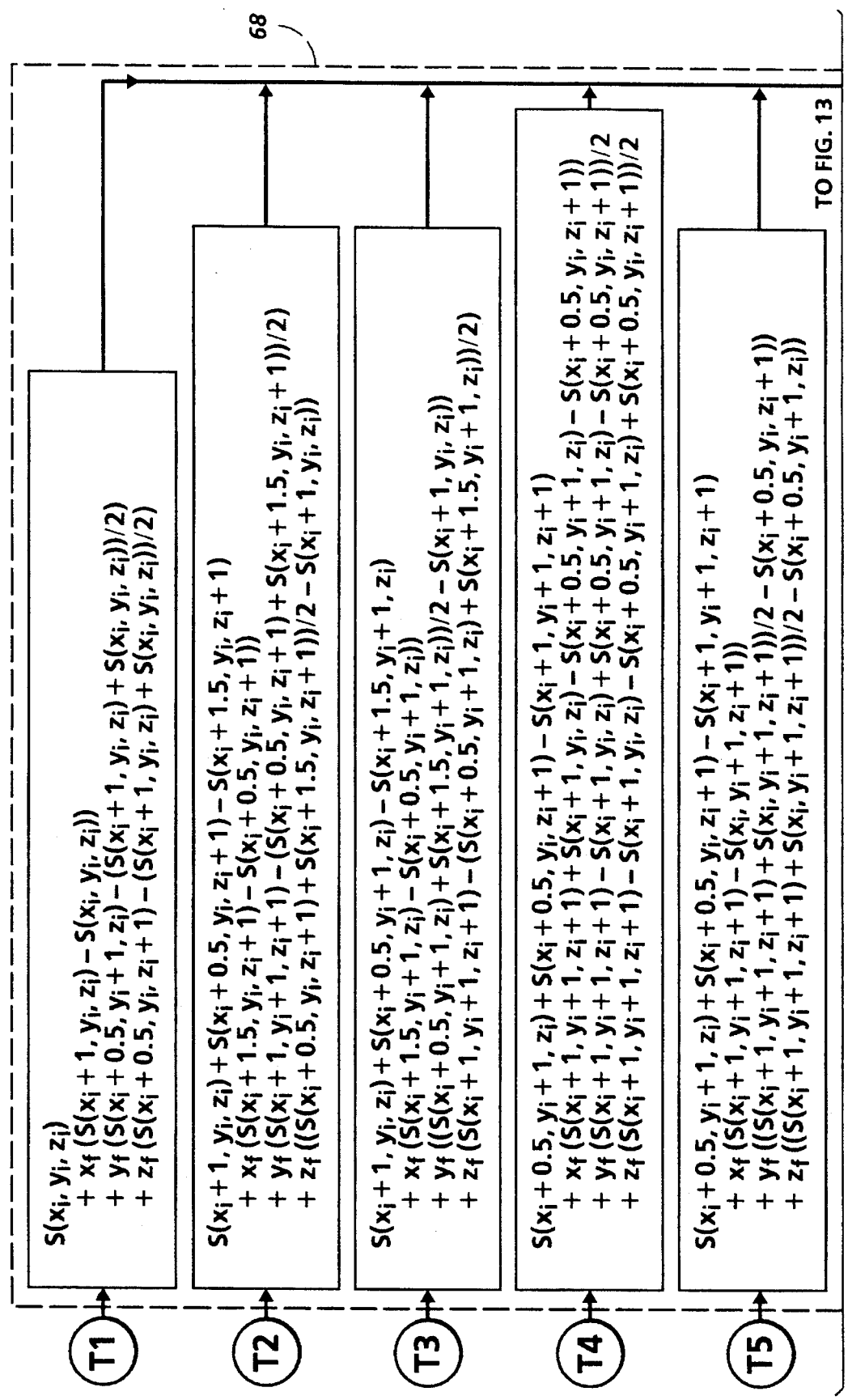
FIGS. 12 and 13 show step 68 of the FIG. 10 process flow in greater detail.
Figure 13:
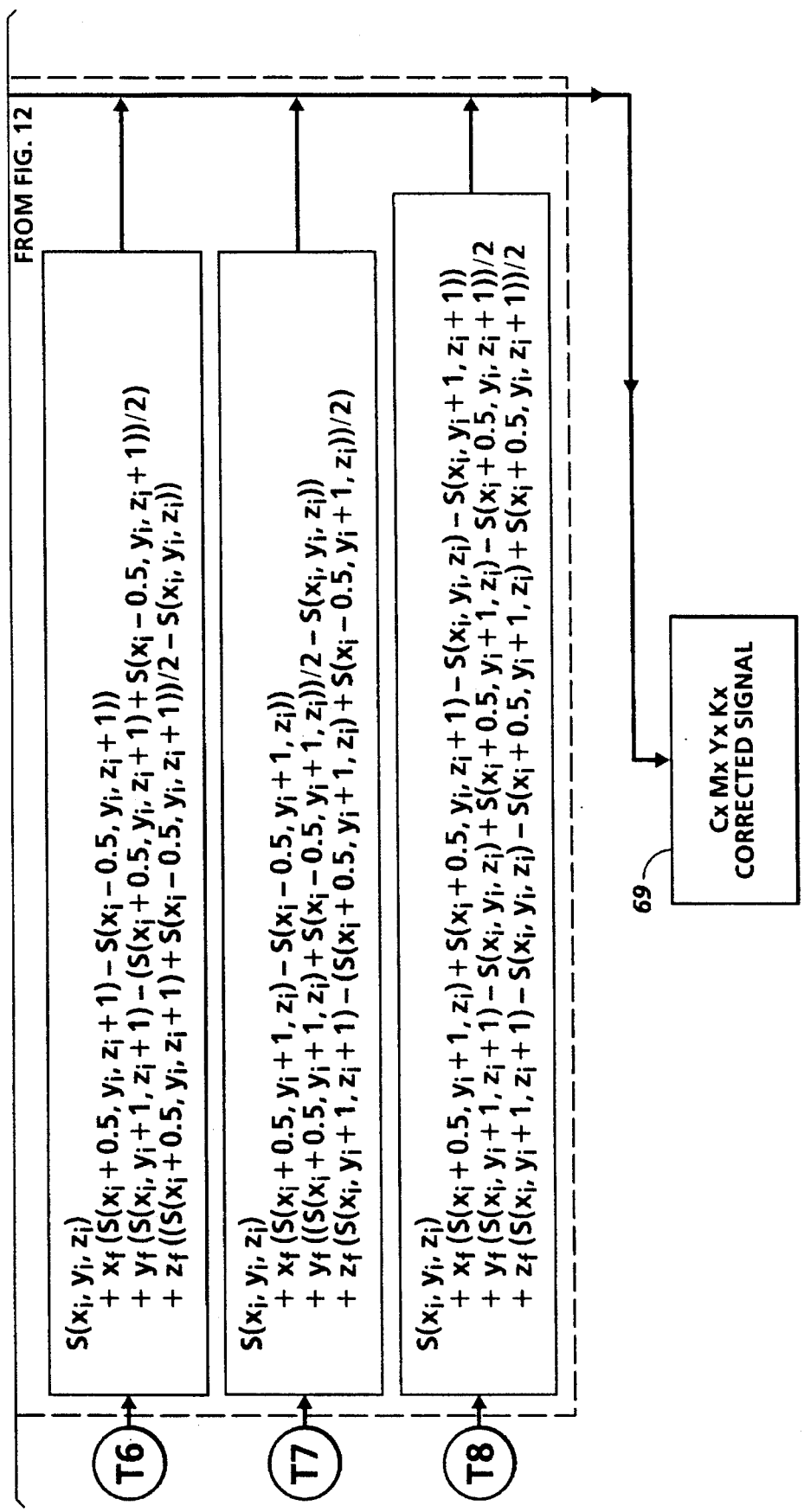

At step 68, calculation circuit 58 evaluates an interpolation formula or a characteristic equation selected by indicator signal $T_n$ to provide corrected color signal $C_x$, $M_x$, $Y_x$, $K_x$. To evaluate the selected interpolation formula calculation circuit 58 interpolates over samples S(x, y, z) (where S is defined herein as C,M,Y and K such that S(x, y, z) corresponds to C(x, y, z), M(x, y, z), Y(x, y, z) and K(x, y, z)) taken at positions x, y, z in color space at step 68 which is shown in detail in FIGS. 12 and 13. Calculation circuit 58 therefore using integer and fractional component signals $x_i$, $y_i$, $z_i$ and $x_f$, $y_f$, $z_f$ interpolates $C_x$, $M_x$, $Y_x$, $K_x$ signals using color space samples from LUT 50. Since the array indices of the LUT 50 no longer map in a strait forward manner to the sample position (integer and fractional component signals $x_i$, $y_i$, $z_i$ and $x_f$, $y_f$, $z_f$), LUT address converter 59 adjusts positions of samples S(x, y, z) so that they correspond to entries P[a,b,c] in the color lookup table 50 (where P is defined herein as C,M,Y and K such that P[a,b,c] corresponds to C[a,b,c], M[a,b,c], Y[a,b,c] and K[a,b,c]). Converter 59 adjusts samples S(x,y,z) according to the following expressions:

$$x = a - ((b+c) \bmod 2)/2; \quad y = b; \text{ and } z = c.$$

Figure 14:
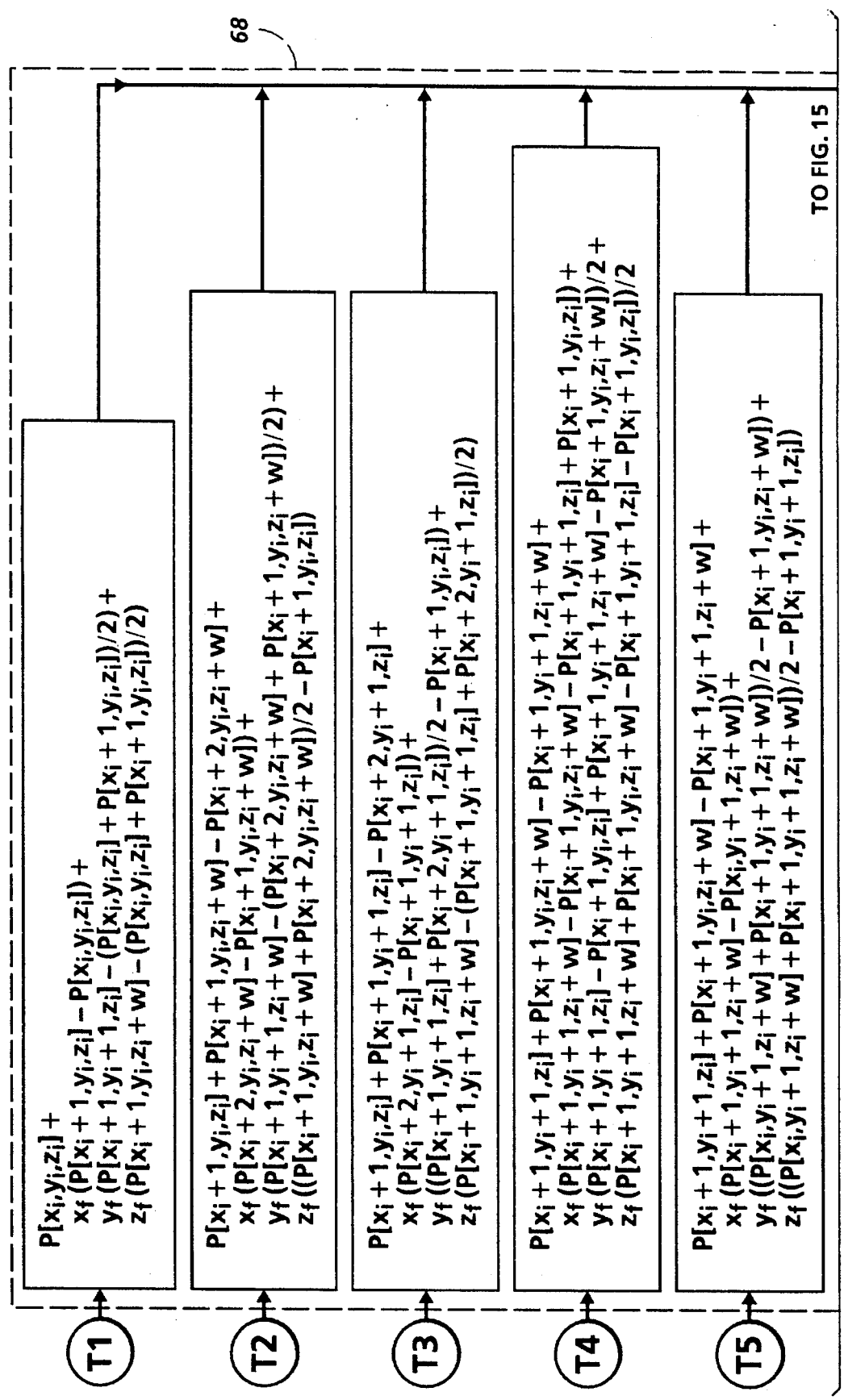
FIGS. 14 and 15 show step 68 of the FIG. 10 process flow in greater detail.
Figure 15:
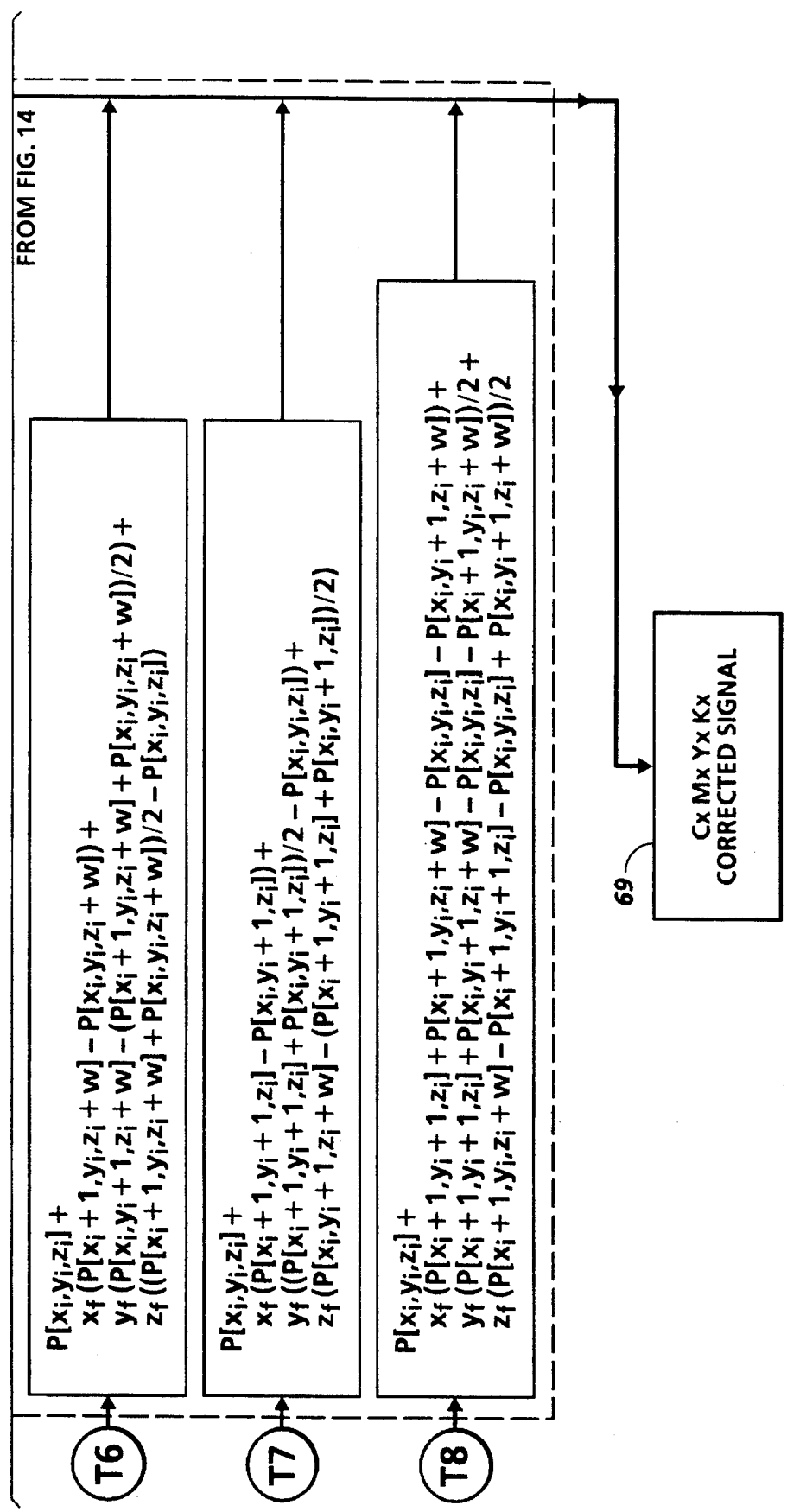
Figure 16:
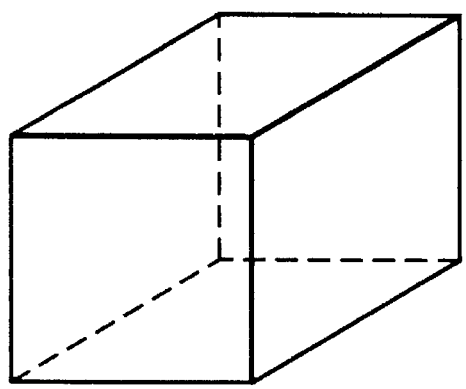
FIG. 16 is an example of a parallelepiped.
Figure 17:
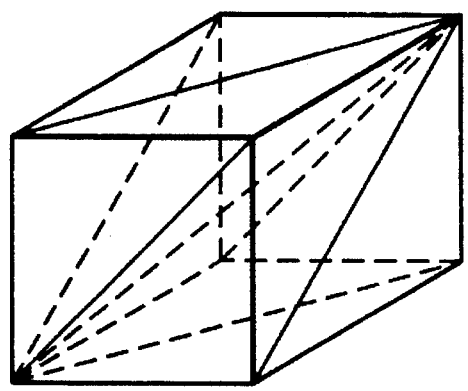
FIG. 17 is an example of a parallelepiped divided into tetrahedrons.
Figure 18:
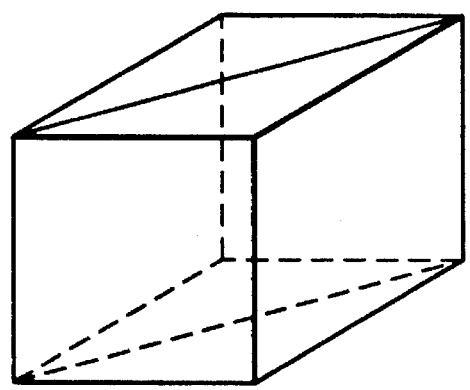
FIG. 18 is an example of a parallelepiped divided into prisms.
Figure 19A:
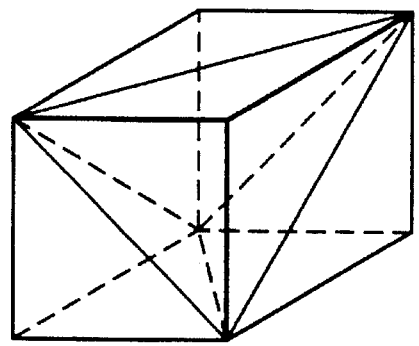
FIG. 19 is an example of parallelepipeds divided into more uniform tetrahedra than those shown in FIG. 17.
Figure 19B:
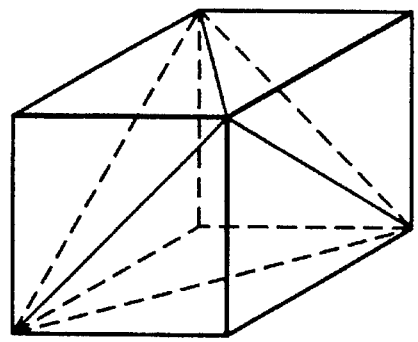
Figure 20:
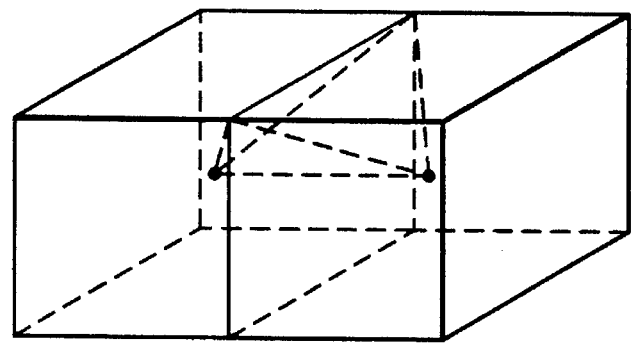
FIG. 20 is an example of parallelepipeds divided into tetrahedra with body-centered sample points.

Accordingly, interpolation is accomplished by calculator circuit 58 using entries P[a,b,c] in the color lookup table 50 and integer and fractional component signals $x_i$, $y_i$, $z_i$ and $x_f$, $y_f$, $z_f$ as shown in FIGS. 14 and 15, which results in the $C_x$, $M_x$, $Y_x$, $K_x$ colorant signal at step 69. Color lookup table 50 therefore consists of four tables with entries for each color separation C,M,Y,K. Alternatively, color lookup table 50 can consist of a table of vectors.

In the Appendix is a C code listing of a software implementation for performing color correction by tetrahedral interpolation over a hexagonal lattice in accordance with the present invention. The implementation consists of determining the integer and fractional portions of the coordinates of a desired point. The determined integer and fractional portions are used for selection of the interpolating tetrahedron before actual interpolation. The implementation then determines whether to use even or odd geometry of FIG. 6. An odd geometry is accounted for by modifying the Z coordinate. After accounting for the particular geometry the implementation uses a series of branching tests to determine which tetrahedron should be used, for each case there is a statement which performs interpolation to provide corrected output color signal $C_x$, $M_x$, $Y_x$, $K_x$.

It will no doubt be appreciated that there are a number of possible variants of the present invention. For instance, each parallelepiped cell shown in FIG. 6 does not have to be a unit cube. What is required however by the invention is that a color sample space divided into parallelepipeds is not required to have all of its sample points or values at the vertex points of each parallelepiped. Accordingly, the present invention describes a method for color correction based on table look up and interpolation. The present invention differs from previous methods of tetrahedral interpolation in that sample points of color space for one of the dimensions are offset by half a unit on every other row, to form a hexagonal or triangular lattice of sample points. The lattice of sample points or sample space is then subdivided into tetrahedrons which are interpolated. Such a sample space geometry advantageously provides closer packing of sample points while still allowing easy table access and simple tests to determine which tetrahedron contains a desired point or value. Although calculations may be more complicated previous methods of tetrahedral interpolation, the sample space geometry of the present invention defines uniform tetrahedrons while the closer packing of sample points in the space provides a dense sample space which reduces interpolation error without increasing the number of sample points required for interpolation.

It will also be appreciated that there exists many variations of the method and apparatus for image color correction of colorimetric images formed with device independent signals $R_c$, $G_c$, $B_c$ that are converted to device dependent signals or colorant driving signals $C_p$, $M_p$, $Y_p$, $K_p$. For example, post-scanning processor 22 and pre-display processor 28 use a lookup table with interpolation to perform color correction and can therefore be readily modified to incorporate the present invention. Additionally, the method of tetrahedral interpolation over a hexagonal lattice of the present invention is not limited to RGB and CMY color space and can be used to convert to any number of color spaces.

The disclosed image processing system may be readily implemented in software using object oriented software development environments that provide portable source code that can be compiled for use on a variety of hardware platforms. Alternatively, the disclosed image processing system may be implemented partially or fully in hardware using standard logic circuits or specifically on a single chip using VLSI design. Whether software or hardware is used to implement the system varies depending on the speed and efficiency requirements of the system and also the particular function and the particular software or hardware systems and the particular microprocessor or microcomputer systems being utilized. The image processing system, however, may be readily developed by those skilled in the applicable arts without undue experimentation from the functional description provided herein together with a general knowledge of the computer arts.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

I claim:

1. A color image processing system for converting a color image from a first color space to a second color space, comprising:

an image input terminal for generating a plurality of three dimensional image signals of the first color space of a color input image;

a memory, addressable by the image signals of the first color space received from said image input terminal, said memory including memory locations for storing corrective image signals of the second color space, wherein the image signals of the first color space define a hexagonal three dimensional lattice of color samples by having a selected sampling interval of one dimension of the hexagonal three dimensional lattice of color samples offset relative to at least one other dimension of the lattice of color samples;

a circuit for determining a plurality of color samples from the image signals that form one of a plurality of multifaced solids, each multifaced solid enclosing a three dimensional image signal in the lattice of color space samples, said circuit generating a characteristic equation identifier for one of the plurality of multifaced solids associated with one of the three dimensional image signals, and said circuit further generating a corrective image signal in the second color space in response to each image signal of the first color space received from said image input terminal, storing the corrective image signal in said memory, and interpolating using a characteristic equation, selected in response to the characteristic equation identifier, and the corrective image signals stored in said memory to produce color image signals of the second color space; and an image output terminal, responsive to color image signals of the second color space, for reproducing each corrective image signal to form a color output image that substantially corresponds to the color input image.

2. The color image processing system of claim 1, wherein said image input terminal comprises a scanner that provides device dependent scanner signals in R, G, B color space.

3. The color image processing system of claim 2, further comprising a post-scanner processor for transforming device dependent scanner image signals from device dependent color space to device independent color space.

4. The color image processing system of claim 1, wherein said image input terminal comprises a page description language driver that generates image elements having a color defined in device independent color space.

5. The color image processing system of claim 1, further comprising a discriminator circuit for receiving from said image input terminal three dimensional image signals from the first color space, said discriminator circuit separating each three dimensional image signal into three integer components and three fractional components.

6. The color image processing system of claim 1, wherein said circuit samples the three dimensional lattice of color samples with a sampling interval in one dimension offset by a half unit every other sampling interval with respect to a second dimension.

7. The color image processing system of claim 1, wherein two dimensions of the three dimensional lattice of color samples forms a non-rectangular lattice of points.

8. The color image processing system of claim 1, wherein each multifaced solid is defined by four color space samples addressing said memory.

9. The color image processing system of claim 8, wherein each multifaced solid is a tetrahedron.

10. The color image processing system of claim 9, wherein said circuit interpolates a characteristic equation for a tetrahedron.

11. The color image processing system of claim 1, wherein said image output terminal comprises a printer that receives as input color device dependent driving signals in C, M, Y color space.

12. The color image processing system of claim 1, wherein said circuit comprises:

a selection circuit for generating the characteristic equation identifier; and a calculator circuit for receiving each characteristic equation identifier generated by said selection circuit, and generating the corrective image signal in the second color space for each image signal in the first color space.

13. A method for converting a color image from a first color space to a second color space, comprising the steps of:

generating, with an image input terminal, three dimensional image signals of the first color space of a color input image;

providing a memory, addressable by image signals of the first color space, and including memory locations for storing corrective image signals of the second color space, the image signals of the first color space defining a hexagonal three dimensional lattice of color samples with one dimension of the hexagonal lattice of color samples having a selected sampling interval offset relative to at least one other dimension of the hexagonal lattice of color samples;

determining a plurality of color samples that form a plurality of multifaced solids from each of the image signals, each of the multifaced solids enclosing each three dimensional image signal in the lattice of color space samples, said determining step generating a characteristic equation identifier for each multifaced solid;

generating a corrective image signal in the second color space for each image signal of the first color space, said generating step interpolating a characteristic equation for a selected one of the multifaced solids with the corrective image signals stored in the memory for the selected one of the multifaced solids; and reproducing each corrective image signal to form a color output image that substantially corresponds to the color input image.

14. The method of claim 13, wherein said generating step comprises the step of scanning an input image to provide signals in device dependent color space.

15. The method of claim 14, further comprising the step of transforming signals from the device dependent color space to a device independent color space.

16. The method of claim 13, further comprising the step of separating each three dimensional image signal into three integer components and three fractional components.

17. The method of claim 13, wherein said providing step comprises the step of defining the sampling interval of the three dimensional lattice of color samples with a sampling interval in one dimension offset by a half unit every other sampling interval with respect to a second dimension.

18. The method of claim 13, further comprising the step of forming two dimensions of the three dimensional lattice of color samples with a non-rectangular lattice of points.

19. The method of claim 13, further comprising the step of defining each multifaced solid with four color space samples.

20. The method of claim 13, wherein said generating step comprises the step of interpolating a characteristic equation for a tetrahedron.

21. A color image processing system for converting a color image signal from a first color space to a second color space, comprising:

an image input terminal for generating a signal of the first color space of a color input image;

a memory, addressable by the image signal of the first color space received from said image input terminal, said memory including memory locations for storing corrective image signals of the second color space, wherein the first color space is defined by a hexagonal three dimensional lattice of color samples having a selected sampling interval of one dimension of the hexagonal three dimensional lattice of color samples offset relative to at least one other dimension of the lattice of color samples;

a tetrahedron selection circuit for selecting one of a plurality of multifaced solids defined by the hexagonal three dimensional lattice of color samples, the selected multifaced solid enclosing the image signal in the lattice of color space samples, said circuit generating a characteristic equation identifier for the selected multifaced solid, a look-up table storing a plurality of sets of transform coefficients, said look-up table being responsive to the image signal of the first color space and outputting a set of transform coefficients in response thereto;

an interpolation circuit, responsive to the characteristic equation selected by said tetrahedron selection circuit and the transform coefficients output by said look-up table, for interpolating the characteristic equation with the transform coefficients to produce color image signals of the second color space; and an image output terminal, responsive to color image signals of the second color space, for reproducing each corrective image signal to form a color output image that substantially corresponds to the color input image.

* * * * *